ns Patent Office 3,473,919
Patented Oct. 21, 1969

3,473,919
PROCESS FOR SEPARATING IRON FROM ALUMINUM
Lincoln Douglas Metcalfe, La Grange, and John Richard Pelka, Glen Ellyn, Ill., assignors, by mesne assignments, to Armour Industrial Chemical Company, a corporation of Delaware
No Drawing. Filed June 5, 1967, Ser. No. 643,411
Int. Cl. C01f 7/46; C07f 15/02
U.S. Cl. 75—103    7 Claims

ABSTRACT OF THE DISCLOSURE

A process for selectively separating iron from an acidic aqueous ore solution containing ferric salts and aluminum salts in which the anion concentration is from 10 to 200 grams per liter, which comprises (1) forming an organic solvent containing a relatively inert organic diluent and either a secondary-alkyl benzyl quaternary ammonium salt, a phenyl-substituted aliphatic quaternary ammonium salt, or a polyalkoxylated benzyl aliphatic quaternary ammonium salt; (2) intimately contacting and mixing the organic solvent and the aqueous solution to effect transfer of substantially all of the ferric salt from the aqueous solution to the organic phase; and (3) separating the resulting ferric salt loaded organic solution from the ferric salt depleted aqueous solution.

BACKGROUND OF THE INVENTION

This invention relates to a process having utility in the field of metallurgy for separating iron from aluminum. More particularly it relates a liquid-liquid solvent extraction process for separating iron from an acidic aqueous mixture of iron and aluminum.

Generally, aluminum cannot be produced directly from bauxite and other aluminum bearing ores because other metals present as impurities in the ore would be carried through the processing and become alloyed with the aluminum. For this reason, the ore must be refined to exclude the other metals and to produce an alumina (aluminum oxide) of high purity, from which metallic aluminum can be obtained.

Difficulties have been encountered in producing high-grade alumina for further processing to the resultant metallic aluminum when the ore contains significant amounts of iron. For example, in one well known procedure, aluminum bearing ore is first calcined with caustic soda to obtain water-soluble sodium aluminates and then leached with an acid, such as hydrochloric acid, to obtain water-soluble aluminum salts which are then treated to convert the aluminum present therein to high-grade alumina. This acid leach procedure also dissolves metals other than aluminum that are present in the ore. Thereby, if the ore contains significant quantities of iron, the acid leach liquor will be contaminated with an approximately corresponding amount of undesirable iron salts.

SUMMARY OF THE INVENTION

We have discovered that certain quaternary ammonium compounds may be used to effect excellent separation, without the formation of an emulsified third phase, of iron from aluminum. Thereby, ores containing substantial amounts of aluminum but also containing iron may be utilized in acid leach processes for the production of aluminum, without resulting in a metallic aluminum containing substantial amounts of iron.

Therefore, an object of our invention is to provide a process for separating iron from aluminum. Another object is to provide a process for efficiently separating iron from an acidic aqueous mixture of iron and aluminum. A further object is to provide a process for efficiently separating iron from a mixture of iron and aluminum without the formation of an emulsified third phase.

Other objects and advantages and a fuller understanding of our invention may be obtained by referring to the following description and examples.

DETAILED DESCRIPTION OF THE INVENTION

In a specific embodiment, our invention may be exemplified by forming an organic solvent containing a suitable quaternary ammonium salt extractant, such as N, N-dimethyl-N-($C_{11}$–$C_{14}$ secondary-alkyl) benzyl ammonium chloride, dissolved in a relatively inert organic carrier or diluent, such as kerosene; and intimately contacting and mixing the organic solvent with an acidic aqueous feed solution containing aluminum salt and a relatively lower concentration of the ferric salt to be extracted, so as to substantially transfer or extract the ferric solute from the aqueous feed solution to the organic phase. The resulting organic phase containing the ferric solute is called the loaded extract; the aqueous phase from which the ferric solute has been removed is called the raffinate. The raffinate may undergo further extraction or other purification and processing steps to aluminum. Further, the loaded organic extract may be intimately contacted and mixed with a back-wash—that is, an aqueous solution in which the concentration of the anions of the ferric salt is relatively low—to strip the ferric salt from the loaded extractant and thereby substantially reconstitute the original organic solvent.

Suitable quaternary ammonium salts may be selected from the group consisting of: (a) secondary-alkyl benzyl quaternary ammonium compounds wherein the alkyl radical contains from 8 to 22 carbon atoms, (b) phenyl-substituted aliphatic quaternary ammonium compounds wherein the aliphatic radical contains from 8 to 22 carbon atoms, and (c) polyalkoxylated benzyl aliphatic quaternary ammonium compounds wherein the aliphatic radical contains from 12 to 18 carbon atoms.

Secondary-alkyl benzyl compounds as described above have the structure

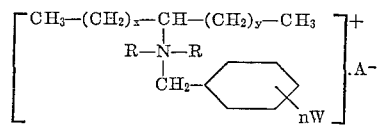

wherein A is an anion such as chloride or sulfate, preferably corresponding to the anionic portion of the acid being used for the separation, $x$ and $y$ are integers having a sum from 5 to 19, R is selected from the group consisting of methyl, ethyl and $(CH_2(CH_2)_mO)_n$, wherein $m$ is an integer from 1 to 2 and $n'$ is an integer from 2 to 15, W is selected from the group consisting of chloride, bromide and iodide and $n$ is an integer from 0 to 3. These compounds may be prepared by reacting an aralkyl quaternizing agent, such as benzyl halide or benzyl sulfate, with one or more secondary-alkyl tertiary amines derived by the reaction of acrylonitrile with a secondary-alkyl primary amine.

The phenyl-substituted quaternary ammonium compounds described above have the structure

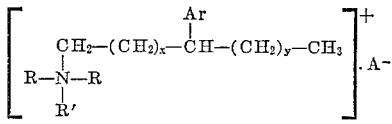

wherein R, A, $x$ and $y$ are as described hereinabove, Ar is selected from the group consisting of phenyl and phenyl substituted with from one to two groups selected from the group consisting of methyl, hydroxy and methoxy, and R' is selected from the group consisting of methyl, ethyl, $(CH_2(CH_2)_mO)n'$ wherein $m$ is an integer from 1 to 2 and $n'$ is an integer from 2 to 15, and

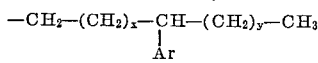

These compounds contain one or more long chain aliphatic groups to which an aryl group is attached as a side chain, thereby providing an aralkyl group. They may be prepared by first arylating long chain fatty acids, such as oleic or palmitoleic acid, by known procedures. The arylated fatty acid may then be converted to the corresponding nitrile, the nitrile converted to the primary amine, and the primary amine quaternized by reaction with a quaternizing agent such as methyl chloride or dimethyl sulfate. The carbon to which the aryl group is attached varies due to double bond migration in the unsaturated fatty acids, resulting under most reaction conditions in a mixture of isomeric products.

The polyalkoxylated benzyl aliphatic quaternary ammonium compounds described above have the structure

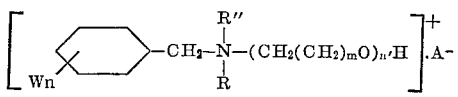

wherein A, W and $n$ are as described hereinabove, $m$ is an integer from 1 to 2, $n'$ is an integer from 2 to 15 and $R''$ is an aliphatic radical containing from 12 to 18 carbon atoms. These compounds may be prepared by alkoxylating the aliphatic primary amine with oxides such as ethylene oxide or propylene oxide before quaternizing by procedures well known in the art.

The organic diluent for the quaternary ammonium salts is not critical, but preferably is an inert, non-polar aliphatic or aromatic hydrocarbon. Suitable diluents include heptane, benzene, aryl halides, petroleum fractions such as naptha and derivatives thereof, and mixtures of the foregoing. We prefer to use kerosene of high flash point and low aromatic content as the diluent for our quaternary ammonium salts for reasons of economy and low fire hazard.

The amount of the useful quaternary ammonium salts to be used in our process can be adjusted over a wide range to obtain the most efficient and economical extraction of ferric salt and to control phase separation characteristics of the aqueous/organic system. We have found that an organic solvent containing about 3% to about 6% by weight quaternary ammonium salt is suitable. Any particular concentration to be used will be dependent upon the particular quaternary ammonium salt, its solubility in the particular diluent and the presence or absence of an alcohol modifier.

An alcohol modifier may be added to the organic solvent solution to modify the surface tension and related physical properties of the constituents of the solution. The modifier acts to improve phase separation and to inhibit the formation of an emulsion or the occurrence of opposite phase entrainment when the organic solvent is mixed and agitated with the feed solution. A preferred modifier which may be added to the organic solvent is normal decyl alcohol. Other suitable modifiers include other aliphatic alcohols containing 8 to 16 carbon atoms, such as normal octyl alcohol, dodecyl alcohol, tridecyl alcohol, lauryl alcohol, myristic alcohol, and mixtures of these alcohols. The quantity of the modifier in the organic solution to substantially inhibit emulsion formation or occurrence of opposite phase entrainment will depend upon the specific modifier employed as well as such other factors as the specific quaternary ammonium salt and organic diluent employed, the concentration of ferric salt in the feed solution, the organic/aqueous solution ratio, and the temperature of the system. Preferably the quantity of modifier is close to the minimum quantity that will effectively inhibit formation of an emulsion or the occurrence of opposite phase entrainment. There does not appear to be a critical upper limit on the amount of modifier that may be employed, but we prefer to use no more than 25% by volume. By way of example, the presence of from about 5% to 10% by volume normal decyl alcohol in a kerosene diluent containing 4.7% N,N-dimethyl-N-($C_{11}$–$C_{14}$ sec-alkyl)-N-benzyl ammonium chloride will effectively prevent the formation of an emulsified third phase.

When the ratio by volume of the organic solvent to the aqueous feed is 1:2 or higher, we have found that employing a 0.05 to 0.2 molar solution of the quaternary ammonium salt in the organic diluent substantially transfers all of the ferric salt content of an aqueous feed solution. The magnitude of this ratio depends primarily on the concentration of the quaternary ammonium salt in the organic solvent. We prefer an organic/aqueous volume ratio of about 1:1 to 4:1 in the practice of our invention.

The temperature of the process is not critical; however for reasons of economy and convenience we prefer to operate at substantially room temperature (between 65° F. and 85° F.).

The aqueous feed solution containing the ferric salt to be separated therefrom and the organic solvent containing the quaternary ammonium salt may be brought intimately together by conventional procedures for contacting immiscible liquids. For example, they may be mixed by vigorous agitation by hand or machine shaking.

In the presence of a high concentration of the anion in the aqueous feed, the ferric salt is transferred from the aqueous phase to the organic phase. The exact nature of this transfer is not known. It is believed, however, to be what may be termed a chemical addition reaction wherein the ferric chloride forms a water-insoluble complex, compound, or association with the quaternary ammonium salt in the organic phase. That is, then, what is known in the metallurgical terminology of solvent extraction as a liquid ion exchange process, wherein the quaternary ammonium salt complex serves as an anion exchanger to react chemically with the desired ions in the aqueous feed, forming a new compound or association which is soluble in the organic diluent.

To transfer a substantial proportion, such as 75%, of the iron from the aqueous phase into the organic phase, the anion concentration in the feed should be at least about 10 grams per liter (adjusted thereto by acid or salt addition). Higher anion concentrations in the feed (up to about 200 grams per liter) may be used to drive an even larger proportion (e.g. up to about 99.9%) of the iron from the aqueous phase into the organic phase. At anion concentrations greater than 200 grams per liter, the solution sufficiently approaches saturation with respect to aluminum salt hexahydrates, and its density and viscosity become so high, as to induce problems in handling and avoiding aluminum losses.

On completion of the extraction operation, the aqueous/organic mixture is allowed to separate into its component, mutually immiscible aqueous and organic phases. The aqueous phase (raffinate), containing less than about 0.05 grams of $Fe_2O_3$ (in solution as iron salt) per liter of solution, is physically removed from contact with the organic phase (extractant) for further processing; for example, for further purification to produce high-grade alumina from which aluminum may be readily obtained. The organic phase (loaded extractant), which may contain up to about 2.5 grams per liter $Fe_2O_3$ (present in solution as iron salt) if the molar concentration of the quaternary ammonium salt therein is 0.1, may then be treated to strip the ferric salt from the extractant. This may be accomplished by bringing the loaded extractant into intimate contact with either water or a dilute liquor of a corresponding acid containing a substantially lower concentration of the anions than the original feed solution. The extractant so stripped of ferric salt content is thereby a reconstitution of the organic solvent in substantially its original form, and may be reused to treat additional acidic aqueous solutions containing ferric and aluminum ions.

To strip a substantial portion (e.g., half) of the iron from the extractant, the anion concentration in the backwash should be below 25 grams per liter; and to achieve a substantial concentration of iron in the backwash the anion concentration therein should not exceed 15 grams per liter. The ratio of the volume of backwash to the volume of ferric salt containing extractant that is required to effect transfer of substantially all of the recoverable ferric salt from the extractant to the backwash will depend on the concentration of the acid of the anion in the backwash, the concentration of ferric salt in the extractant, the specific quaternary ammonium salt present in the extractant, the temperature of the organic/ aqueous system and on other similar factors. We have found that an organic/aqueous system ratio of about 15:1 is usually sufficient to effectively strip the ferric salt from the extractant and thereby reconstitute the organic solvent for further liquid-liquid solvent extractions to separate iron from aluminum.

In order to more fully understand the nature of the compounds of the present inveniton, their characteristics, and the manner in which they may be used, the following specfic examples are provided.

EXAMPLE I

A one liter, three necked flask equipped with a mechanical stirrer, thermometer, addition funnel, and a reflux condenser was charged with 360 g. (1.47 moles) of N,N-dimethyl-N-($C_{11}$–$C_{15}$)-sec-alkyl amine and 120 g. of isopropanol. The temperature was raised to 65°–70° C. and 194 g. (1.54 moles) benzyl chloride was added, with stirring, over a one hour period. The reaction mixture was then maintained at 65°–70° C. for thirteen hours. After this time the reaction product, N,N-dimethyl-N-($C_{11}$–$C_{15}$)-sec-alkyl-N-benzyl quarternary ammonium chloride, was diluted with additional isopropanol to a concentration of approximately 50% (mass yield 92.4%).

*Analysis.*—Quaternary, 45.7%; free amine, 0.74%; amine HCl, 0.2%.

EXAMPLE II

Phenylstearic acid was prepared from commercial grade oleic acid, which contained a few percent of palmitoleic acid, by a Friedel-Crafts reaction using aluminum chloride as the catalyst and benzene as the arylating agent. Thereafter, 1127 g. of the phenylstearic acid were converted to phenylstearonitrile on a continuous nitrile unit over bauxite catalyst at 280–300° C. A crude yield of 835.5 g. was obtained comprising a mixture of isomers. 591 g. of this product was reduced in a 1-liter, Parr autoclave over 2% (by weight) alcohol washed Raney nickel catalyst in the presence of ammonia (150 p.s.i./30°–40° C.) and hydrogen (800 p.s.i. total pressure at 125° C. for 4–5 hours). 582.3 g. (97% crude yield) of a light amber oil was obtained. Upon distillation at 183–190° C/0.3 mm., pure phenyloctadecylamine was obtained in 67% yield. 50 g. (0.145 mole) of phenyloctadecylamine and 25 g. (0.31 mole) of $NaHCO_3$ in 50 ml. isopropanol were treated with methyl chloride at 75°–80° C./70 p.s.i in a 300 cc. stirred autoclave for 3.5–4 hours to obtain the quaternary. Carbon dioxide was removed by periodic venting of the reaction mixture and, at the completion of reaction, the resulting product was diluted to an approximately 50% solution of quaternary in isopropanol. The product was a mixture of isomers of N,N,N-trimethyl-N-phenyloctadecylammonium chloride, with the analysis: Quaternary, 43.6%; free amine, nil; amine. HCl, nil.

EXAMPLE III

An aqueous iron, aluminum and hydrochloric acid feed solution was prepared using the corresponding metal chloride hexahydrates and adding an appropriate volume of aqueous concentrated hydrochloric acid. The metal salts were expressed as their oxides, and the aqueous feed solution contained per liter 80.217 grams $Al_2O_3$, 2.50 grams $Fe_2O_3$ and 10.0 grams HCl.

An organic solvent was prepared to contain 4.7% quaternary ammonium chloride, 9.3% n-decyl alcohol and 86.0% kerosene. The organic solutions were prepared by first adding the appropriate amounts of the quaternary ammonium chloride to the alcohol and then bringing to volume with kerosene. In instances where the activity of the quaternary ammonium chloride was not near 100%, this fact was taken into consideration and that amount of the quaternary which would equal 4.7% quaternary ammonium chloride in the final organic solvent was added.

In this example, two quaternary ammonium chlorides were used, viz. N,N-dimethyl-N-($C_{11}$–$C_{14}$ sec-alkyl)-N-benzyl ammonium chloride (hereinafter referred to in the tables as Sample 1) and N,N-dimethyl-N-($C_{15}$–$C_{20}$ sec-alkyl)-N-benzyl ammonium chloride (Sample 2). Amberlite LA-1, an N-dodecyl (trialkylmethyl) amine standard, was compared to the sample compounds.

20 ml. of the above aqueous feed solution and 50 ml. of the above organic solvent (ratio by volume of 2.5 organic to 1.0 aqueous) were added to an 8 ounce glass jar. The jar was then placed on an automatic shaker, the shaker was set on high speed (approximately 270 oscillations per minute) and the solutions were agitated for one-half hour. After the one-half hour period, the solutions were allowed to stand and separate. The solutions were observed for separation of the aqueous and organic phases after standing 10 minutes and again 24–48 hours later.

In this example both samples had completely separated after 10 minutes standing. No emulsion was present.

The aqueous phase was separated from the mixture and analyzed for iron content by X-ray fluorescence and for aluminum content by either X-ray fluorescence or titration. The analysis of the original feed solution, the raffinate from which the iron has been removed by a standard solvent (Amberlite LA-1, an N-dodecenyl (trialkylmethyl) amine) and the raffinate from which the iron has been removed by the two quaternary ammonium salts of this example are set forth in Table I.

TABLE I

| Sample No. | Appearance After Extraction | | Means of Breaking any Emulsion Present After Extraction | Analysis of Aqueous Phase | |
|---|---|---|---|---|---|
| | 10 min. | 24–48 hrs. | | g.$Fe_2O_3$/l. | g.$Al_2O_3$/l. |
| Original solution | | | | 2.50 | 80.217 |
| Amberlite LA-1 | | | | 0.160 | 79.43 |
| 1 | Two distinct phases organic phase turbid. | Two distinct phases organic phase turbid. | No emulsion present | [1] 0.000 | 72.87 |
| 2 | Two distinct phases organic phase clear. | Two distinct phases organic phase clear. | ___do___ | 0.005 | 78.57 |

[1] Approximate.

EXAMPLE IV

The procedure set forth in Example III was repeated using the quaternary ammonium chlorides:

Sample 3: N,N - dimethyl - N,N-di-phenyl-stearyl ammonium chloride;

Sample 4: N,N,N-trimethyl-N-anisylstearyl ammonium chloride;

Sample 5: N,N-di(dihydroxy) tallow-N-benzyl-N-polyethyleneoxide (7 moles) ammonium chloride.

These quaternary ammonium salts formed emulsions in the aqueous phase which were easily broken by separating the emulsion from the mixture and centrifuging until the emulsion broke. In the terminology of solvent extraction, the use of the word "emulsion" is generally reserved for situations where the mixture of aqueous feed and organic solvent are exceedingly slow to separate. Phase separation generally occurs in two steps: the primary break wherein the bulk of the mixture disperses by a process of coalescence and settling into the two component phases; and the secondary break wherein ultra-fine droplets settle out, as evidenced by a gradual clearing of both phases. When the dispersion mixture comprises primarily organic droplets dispersed in the aqueous phase, it is generally likely that a very stable emulsion will be formed and aluminum analysis will be low, which condition may render the system inoperable. However, when aqueous droplets are dispersed in the organic phase there is much less inclination toward an unbreakable emulsion. The aqueous phases obtained in this example were collected and analyzed with the results reported in Table II.

From the results set forth in Table II, it may be observed that although the generally unbreakable type of dispersion resulted, the resulting emulsions were broken with relative ease and with good aluminum analysis.

TABLE II

| Sample No.: | Appearance After Extraction | | Means of Breaking Emulsion | Analysis of Aqueous Phase | |
|---|---|---|---|---|---|
| | 10 min. | 24-48 hrs. | | g.Fe$_2$O$_3$/l. | g.Al$_2$O$_3$/l. |
| Original solution | | | | 2.50 | 80.217 |
| Amberlite LA-1 | | | | 0.160 | 79.43 |
| 3 | Oil in water emulsion, organic phase sl. turbid. | Oil in water emulsion, organic phase sl. turbid. | Centrifuge | 0.006 | 79.10 |
| 4 | do | do | do | 0.133 | 76.79 |
| 5 | do | Emulsion broke | | 0.009 | 77.59 |

EXAMPLE V

Using the procedure set forth in Example III, further evaluations were made of the dimethylsecondaryalkylbenzyl ammonium chlorides used in Example I, N,N-dimethyl-N-($C_{11}$–$C_{14}$sec-alkyl)-N-benzyl ammonium chloride and the N,N-dimethyl-N-($C_{15}$–$C_{20}$sec-alkyl)-N-benzyl ammonium chloride, to determine the effect on solvent extraction characteristics caused by varying the isomer position of the nitrogen functional group. Samples 1 and 2 of Example III were made from amines having high amounts of the amino functional group in the number 2 and 3 isomer position. These samples were compared to Samples 15 and 16, which have the same substitutions but low amounts of the number 2 and 3 isomer position functional group; viz. Table IV:

TABLE IV.—POSITIONED ISOMER DISTRIBUTION OF AMIDE GROUP

Sample 1 (high 2 and 3 position)

| | Chain Length | | | | |
|---|---|---|---|---|---|
| | $C_{11}$, Percent | $C_{12}$, Percent | $C_{13}$, Percent | $C_{14}$, Percent | $C_{15}$, Percent |
| Isomer Position: | | | | | |
| 2 | 36.2 | 33.6 | 37.1 | 33.4 | 33.7 |
| 3 | 37.8 | 33.1 | 35.2 | 31.9 | 34.5 |
| 4+ | 26.0 | 16.4 | 12.5 | 16.5 | 13.9 |
| 5+ | | 16.7 | 15.1 | 9.2 | 10.5 |
| 6+ | | | | 8.9 | 7.4 |

Sample 2 (high 2 and 3 position)

| | Chain Length | | | | | |
|---|---|---|---|---|---|---|
| | $C_{15}$, Percent | $C_{16}$, Percent | $C_{17}$, Percent | $C_{18}$, Percent | $C_{19}$, Percent | $C_{20}$, Percent |
| Isomer Position: | | | | | | |
| 2 | 35.4 | 34.1 | 34.8 | 34.8 | 31.9 | 33.0 |
| 3 | 36.4 | 36.5 | 35.7 | 35.3 | 37.8 | 37.7 |
| 4 | 13.8 | 13.4 | 12.2 | 12.7 | 11.9 | 13.6 |
| 5+ | 14.4 | 16.0 | 17.3 | 17.2 | 18.4 | 15.7 |

Sample 15 (low 2 and 3 position)

| | Chain Length | | | |
|---|---|---|---|---|
| | $C_{11}$, Percent | $C_{12}$, Percent | $C_{13}$, Percent | $C_{14}$, Percent |
| Isomer Position: | | | | |
| 2 | 24.2 | 21.2 | 20.1 | 16.3 |
| 3 | 27.8 | 30.5 | 29.8 | 27.1 |
| 4 | 25.5 | 24.3 | 20.3 | 20.4 |
| 5+ | 22.5 | 24.0 | 12.9 | 17.6 |
| 6+ | | | 16.9 | 18.6 |

Sample 16 (low 2 and 3 position)

| | Chain Length | | | | | |
|---|---|---|---|---|---|---|
| | $C_{15}$, Percent | $C_{16}$, Percent | $C_{17}$, Percent | $C_{18}$, Percent | $C_{19}$, Percent | $C_{20}$, Percent |
| Isomer Position: | | | | | | |
| 2 | 19.6 | 23.3 | 17.2 | 16.4 | 20.9 | 16.5 |
| 3 | 27.3 | 28.1 | 28.8 | 27.5 | 25.5 | 26.4 |
| 4 | 22.9 | 15.2 | 15.2 | 14.3 | 12.5 | 13.2 |
| 5+ | 30.2 | 33.4 | 38.8 | 14.6 | 11.9 | 12.9 |
| 6+ | | | | 27.2 | 29.2 | 33.0 |

The results are shown in Table V. The known collector Aliquot 336 is probably slightly better than indicated, because in making up the solutions the Aliquot 336 sample was considered to be 100% active whereas it was actually 75% active. It may be observed from Table V that the isomer distribution is a factor in the efficiency of the dimethylsecondaryalkylbenzyl quaternary ammonium chlorides as organic solutes for the selective solvent extraction of iron from aqueous feed materials containing iron and aluminum; the high position isomers are more efficient.

TABLE V.—ANALYSIS OF AQUEOUS SOLUTIONS FOR IRON AND ALUMINUM

| Solvent Used | g.$Fe_2O_3$/liter | g.$Al_2O_3$/liter |
| --- | --- | --- |
| Original Solution | 2.50 | 80.5 |
| Amberlite LA-1 | 0.110 | 79.43 |
| Aliquot 336[1] | 0.021 | 78.8 |
| Sample 15 Low 2 and 3 Position | 0.023 | 76.5 |
| Sample 1 High 2 and 3 Position | 0.000 | 72.9 |
| Sample 16 Low 2 and 3 Position | 0.027 | 77.9 |
| Sample 2 High 2 and 3 Position | 0.005 | 78.6 |

[1] 75% active tricaprylmethyl ammonium chloride, but sample was used as though it were 100% active.

While the present invention has been described and exemplified in terms of preferred embodiments, those skilled in the art will appreciate that variations can be made without departing from the spirit and scope of the invention.

We claim:

1. A process for selectively separating iron from an acidic aqueous solution containing iron salts and aluminum salts, which comprises the steps of:
   (1) providing an organic solvent containing a relatively inert organic diluent and a quaternary ammonium salt extractant, said extractant being selected from the group consisting of (a) secondary-alkyl benzyl quaternary ammonium compounds wherein the alkyl radical contains from 8 to 22 carbon atoms, (b) phenyl substituted aliphatic quaternary ammonium compounds wherein the aliphatic radical contains from 8 to 22 carbon atoms and (c) polyalkoxylated benzyl aliphatic quaternary ammonium compounds wherein the aliphatic radical contains from 12 to 18 carbon atoms;
   (2) intimately contacting and mixing the organic solvent and the aqueous solution to effect transfer of substantially all of the ferric salt from the aqueous solution to the organic phase; and
   (3) separating the resulting ferric salt loaded organic solution from the ferric salt depleted aqueous solution.

2. The process of claim 1 in which the anion concentration of the aqueous feed solution is from 10 to 200 grams per liter.

3. The process of claim 1 wherein the organic solvent contains from about 3% to about 6% of the quaternary ammonium salt extractant.

4. The process of claim 1 wherein the ratio of the volume of organic solvent to the volume of the aqueous solution contacted with each other is from about 1:1 to 4:1.

5. The process of claim 1 in which the organic solvent contains from 3% to 25% by volume of at least one modifier selected from the group consisting of aliphatic alcohols containing from 8 to 16 carbon atoms.

6. The process of claim 1 in which the quaternary ammonium salt is N,N-dimethyl-N($C_{11}$–$C_{14}$sec-alkyl)-N-benzyl ammonium chloride.

7. The process of claim 1 in which the quaternary ammonium salt is N,N-dimethyl-N($C_{15}$–$C_{20}$sec-alkyl)-N-benzyl ammonium chloride.

References Cited

UNITED STATES PATENTS

| | | | |
| --- | --- | --- | --- |
| 2,955,932 | 10/1960 | Goren | 75—121 |
| 3,104,971 | 9/1963 | Olson et al. | 75—103 |
| 3,240,562 | 3/1966 | Brown et al. | 75—101 |

HOKE S. MILLER, Primary Examiner

OSCAR R. VERTIZ, Assistant Examiner

U.S. Cl. X.R.

75—121